Figure 1:
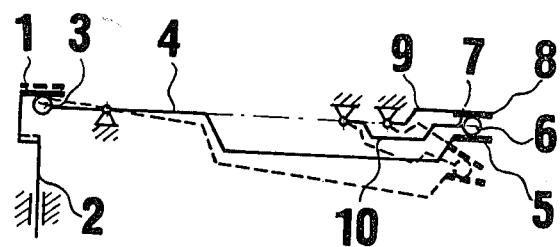

United States Patent [19]

Ratajczyk et al.

[11] 4,047,305
[45] Sept. 13, 1977

[54] LINK MECHANISM OF A MECHANICAL TRANSDUCER, ESPECIALLY OF A TOOTHED AMPLIFYING GAUGE

[75] Inventors: Eugeniusz Ratajczyk; Januariusz Gościmski; Adam Jędrzejewski, all of Warsaw, Poland

[73] Assignee: Politechnika Warszawska, Warsaw, Poland

[21] Appl. No.: 673,104

[22] Filed: Apr. 2, 1976

[30] Foreign Application Priority Data

Apr. 8, 1975 Poland .................................. 179417

[51] Int. Cl.² ............................ G01B 3/22; G01B 5/00
[52] U.S. Cl. .................................................. 33/172 R
[58] Field of Search ........................ 33/172 R, 172 B

[56] References Cited

· U.S. PATENT DOCUMENTS

| | | | |
|---|---|---|---|
| 900,472 | 10/1908 | Boettcher | 33/172 B |
| 900,531 | 10/1908 | Hardinge | 33/172 R |
| 2,077,123 | 4/1937 | Mahr | 33/172 R |
| 2,506,167 | 5/1950 | Pasquet | 33/172 R |

FOREIGN PATENT DOCUMENTS 575,127  2/1946  United Kingdom ............. 33/172 R

*Primary Examiner*—Harry N. Haroian
*Attorney, Agent, or Firm*—Haseltine, Lake & Waters

[57] ABSTRACT

Link mechanism of a mechanical transducer, especially of a toothed amplifying gauge, consisting of an input member performing a rectilinear motion and contacting in a point with one arm of a double-arm lever, the other arm of which remains in point contact with an output lever, characterized in a preferred example in that the mechanism is equipped with a non-linearity compensator of the transmission in the form of an intermediate member, preferably a shaft rigidly mounted on the rotating arm and arranged between a working surface of the double-arm lever and the working surface of the output lever. The arm of the compensator preferably has an arcuate opening through which the axle of the output lever passes, the latter having an arcuate opening through which the axle of the compensator passes. The latter is preferably positioned parallel and in the same plane as the axes of rotation of the double-armed lever and the output lever.

4 Claims, 5 Drawing Figures

LINK MECHANISM OF A MECHANICAL TRANSDUCER, ESPECIALLY OF A TOOTHED AMPLIFYING GAUGE

This invention relates to a link mechanism of a mechanical transducer, especially of a toothed amplifying gauge, employed for geometrical measurements of machine elements.

There are known two-lever-type and three-lever-type link mechanisms, employed in mechanical transducers, for instance in toothed amplifying gauges, consisting of a plunger performing a rectilinear motions and co-operating with a sine-type lever, and of a sine-type link mechanism — so called sin-sin-type — with a high transmission ratio (of an order of 5 to 10), or a tangent-type mechanism — so called sin-tan-type mechanism — with a transmission ratio equal to 1.5. The three-lever link mechanisms are mostly of the sin-tan-sin type, and consist of a plunger co-operating with the input sine-type lever and two magnifying, tangent-type and sine-type link mechanisms.

The sin-sin-type link mechanisms are characterized by considerable non-linearity of the transmission which renders possible to employ them only in transducers with small measuring ranges. The sin-tan-type link mechanisms are however characterized by a low transmission ratio.

The invention has as its object to extend the working range of a two-lever link mechanism with a high transmission ratio with simultaneous decrease of the non-linearity error of the transmission, and to eliminate the difficulties involved in the construction of a three-lever link mechanism. In order to realize this object a non-linearity compensator is introduced into a two-lever sin-sin-type link mechanism.

The link mechanism of the mechanical transducer according to the invention consists of an input member performing rectilinear motions and remaining in point-type contact with one arm of a double-arm lever, the other arm whereof remains in point-type contact with an output lever, and is characterized in that the mechanism comprises a non-linearity compensator in the form of an intermediate member, preferably a shaft, fitted rigidly on a rotatable arm, and arranged between the working surface of the double-arm lever and the working surface of the output lever.

The arm of the compensator is preferably provided with an arcuate opening through which the axle of the output lever passes, that lever also having an arcuate opening through which the axle of the compensator passes.

The axis of rotation of the compensator is preferably arranged in the plane of the axis of the double-arm lever and of the output lever and is parallel thereto.

A modification of the link mechanism of the mechanical transducer according to the invention has a non-linearity compensator in the form of form of an intermediate member, preferably a shaft, mounted rigidly on the rotatable arm and arranged between the working surface of the input member and the working surface of the double-arm lever.

The axis of rotation of the compensator is preferably parallel to the axis of rotation of the double-arm lever and lies with the latter in a plane perpendicular to the direction of the movement of the input member.

Figure 2:
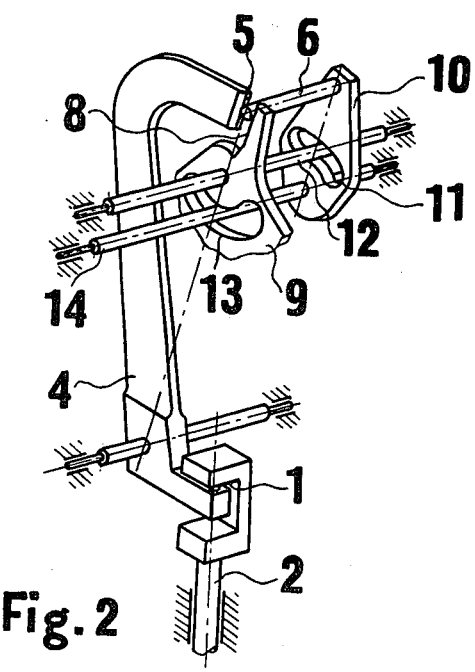
Figure 3:
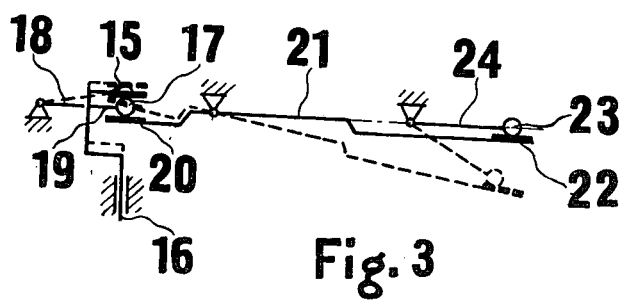
Figure 4:
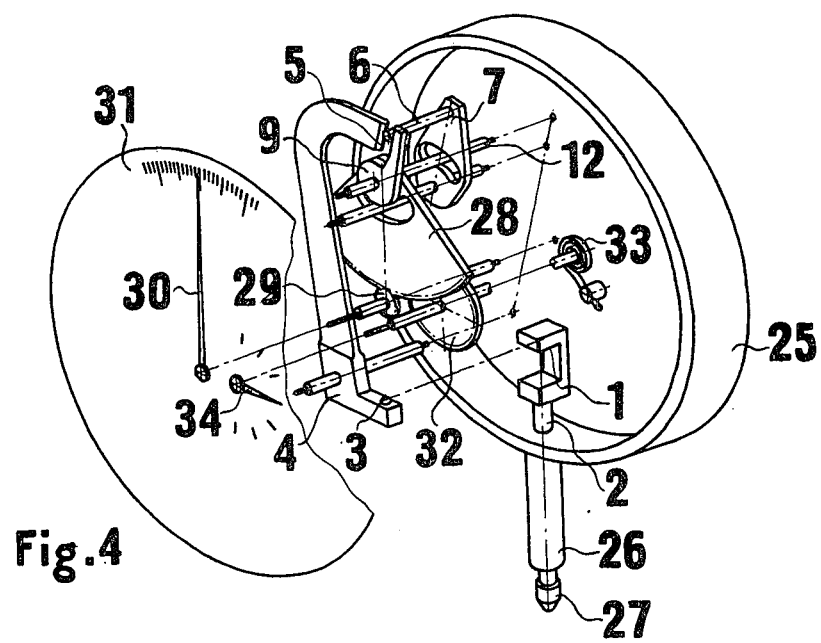
Figure 5:
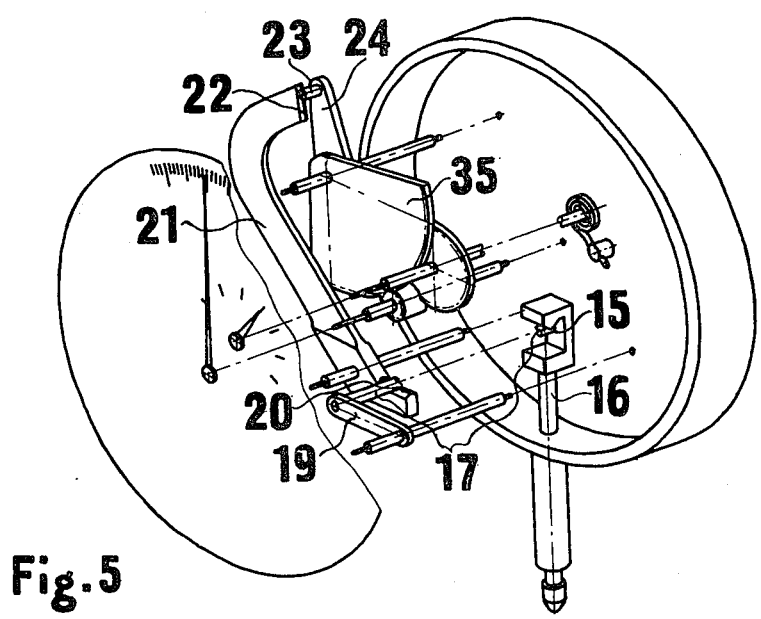

The subject of the invention is shown by way of an exemplary embodiment in the accompanying drawings, in which FIG. 1 is the kinematic diagram of the inventive link mechanism, FIG. 2 is the axonometric projection of the mechanism, FIG. 3 is the kinematic diagram of a modification of the link mechanism, FIG. 4 is the axonometric projection of a portion of the toothed amplifying gauge, and FIG. 5 shows another form of the gauge.

In FIGS. 1 and 2 of the drawing a flat working surface 1 of an input member 2 is in contact with a ball 3 of a double-arm lever 4, the working surface 5 of which is disconnectably connected over a shaft 6 of a compensator 7 with the working surface 8 of an output lever 9. A rotating arm 10 of the compensator 7 has an arcuate opening 11 in which the axle 12 of the output lever 9 is arranged. The output lever 9 also has an arcuate opening 13 in which the axle 14 of the compensator 7 is arranged.

In FIG. 3 of the drawing the working surface 15 of an input member 16 is disconnectably connected over a shaft 17 fitted on an arm 18 of a compensator 19 with the working surface 20 of a double-arm lever 21, the other working surface 22 whereof remains in point-type contact with a shaft 23 of an output lever 24.

FIG. 4 of the drawing shows a toothed amplifying gauge having a body 25 with a catch sleeve 26 in which the input member 2 is arranged, from one side ending in a measuring head 27 and from the other side with the flat working surface 1 perpendicular to the direction of movement of the input member 2. The surface 1 contacts the ball 3 of the double-arm lever 4, the other arm of which ends in the working surface 5, co-operating over the shaft 6 of the compensator 7 with the output lever 9. The latter is mounted on the axle 12 and rigidly connected with a toothed segment 28 meshing with a pinion 29, on the axle whereof a main pointer 30 is mounted, moving along a scale 31 of a dial. Also a toothed gear 32 meshes with the pinion 29. A spiral spring 33 is mounted from one side on the axial of the gear 32, eliminating backlashes within the link mechanism, and from the other side a small pointer 34 is fitted for indicating the number of revolutions of the main pointer 30.

In FIG. 5 of the drawing the toothed amplifying gauge is shown with another modification of the link mechanism. The input member 16 ends with the working surface 15. The latter contacts, over the shaft 17 of the compensator 19, the working surface 20 of the double-arm lever 21, the other arm of which ends with the working surface 22, contacting the shaft 23 of the output lever 24, being connected with the toothed segment 35.

The link mechanism of the mechanical transducer operates as specified hereinbelow. The input member 2, being displaced, presses with its flat working surface 1 the ball 3 of the double-arm lever 4 which, with its working surface 5, presses down the shaft 6 of the compensator 7. Over the shaft 6, the working surface 8 of the output lever 9 thus causes the rotation of the compensator 7 and of the output lever 9. The shaft 6, fitted on the rotating arm 10 of the compensator 7, is displaced during the revolution in relation to the working surface 5 of the double-arm lever 4, and thus causes displacement of co-operating points of the working surfaces 5, 8 in relation to the working surface 8 of the output lever 9, and thus compensation of the non-linearity of the transmission of the link mechanism.

In another example of the link mechanism the input member 16, being displaced, presses with its working surface 15, over the shaft 17 of the compensator 19, the working surface 20 of the double-arm lever 21, causing the rotation of the double-arm lever 21 which then pushes with its working surface 22 the shaft 23 of the output lever 14 and also turns the output lever 24. Due to the rotation of the compensator 19 the contact points of the shaft 17 with the working surfaces 15, 20 of the input member and of the double-arm lever 21, respectively, are displaced. Thus the working surfaces 15, 20 co-operate in points in which the compensation of the non-linearity of the transmission of the link mechanism occurs.

In the toothed amlifying gauge the member 2 falling down presses with its flat working surface 1 the ball 3 of the double-arm lever 4, causing the rotation of the double-arm lever 4 which, with its working surface 5, presses the shaft 6 of the compensator 7 to the output lever 9, and causes the rotation of the output lever 9. Together with the output lever 9 the toothed segment 28 is rotated, which causes the rotation of the pinion 29 and of the main pointer 30 mounted on the segment axle. The displacement of the end of the pointer 30 against the scale on the dial 31 is a displacement of the input member 2 amplified many times, and is used for exact determination of the displacement. The pinion 29 by its rotation causes the rotation of the toother gear 32 and of the small pointer 34, and a stretching of the spiral spring 33. At lifting the input member 2, the stretched spiral spring 33 causes the movement of the elements of the mechanism; hereinafter the input member 2 inhibits the occur within the link mechanism.

In the gauge according to the other exemplary link mechanism, the input member 16, being displaced, presses over the shaft 17 of the compensator 19, the working surface 20 of the double-arm lever 21, causing the rotation thereof. The rotating double-arm lever 21 presses with its working surface 22 the shaft 23 of the output lever 24, connected with the toothed segment 35 which is thus rotated.

List of elements
1 flat working surface
2 input member
3 ball
4 double-arm lever
5 working surface
6 shaft
7 compensator -continued
List of elements
8 working surface
9 output lever
10 rotating arm of the compensator
11 arcuate opening
12 axle of the output lever
13 arcuate opening
14 axle of the compensator
15 working surface
16 input member
17 shaft of the compensator
18 arm of the compensator
19 compensator
20 working surface
21 double-arm lever
22 working surface
23 shaft
24 output lever
25 body
26 catching sleeve           31 dial
27 gauging point             32 toothed gear
28 toothed segment           33 spiral spring
29 pinion                    34 small pointer
30 main pointer              35 toothed segment

What is claimed is:
1. A link mechanism of a mechanical transducer, especially of a toothed amplifying gage, comprising an input member (2) performing a rectilinear motion and contacting in a point one arm of a double-arm lever (4), the other arm whereof contacts in a point an output lever (9), and a transmission compensator (7) in the form of an intermediate member, namely a shaft (6) rigidly mounted on a rotating arm (10) of said compensator and arranged between respective working surfaces (5, 8) of said double-arm lever and of said output lever.

2. The link mechanism as defined in claim 1, wherein said rotating arm (10) has an arcuate opening (11) through which an axle (12) of said output lever (9) passes, said output lever also having an arcuate opening (13) through which an axle (14) of said compensator (7) passes.

3. The link mechanism as defined in claim 1, wherein the axis of rotation (14) of said compensator (7) is parallel and in the same plane with the axes of rotation of said double-arm lever (4) and said output lever (9).

4. A lever gear of a mechanical transducer, especially of a lever and a gear transducer, comprising an input element (16) performing a rectilinear motion and remaining in point contact with one arm of a double-arm lever (21), the other end whereof remains in point contact with an output lever (24), and a non-linearity transmission compensator (19) in the form of an intermediate element, namely a shaft (17) rigidly fitted on a rotative arm (18) of said compensator and located between respective active surfaces (15, 20) of said input element and of said double-arm lever, the axes of rotation of said compensator and of said double-arm lever being on opposite sides of said input element.

* * * * *